(12) United States Patent
Weber et al.

(10) Patent No.: US 11,201,484 B2
(45) Date of Patent: Dec. 14, 2021

(54) ACCESSORY CASE WITH A POWER SUPPLY

(71) Applicant: Apple Inc., Cupertino, CA (US)

(72) Inventors: Robert V. Weber, Redwood City, CA (US); Patrick T. Ryan, San Francisco, CA (US); Min Chul Kim, San Jose, CA (US); Ian P. Colahan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 16/530,836

(22) Filed: Aug. 2, 2019

(65) Prior Publication Data

US 2020/0328605 A1 Oct. 15, 2020

Related U.S. Application Data

(60) Provisional application No. 62/834,312, filed on Apr. 15, 2019.

(51) Int. Cl.
*H01M 10/46* (2006.01)
*H02J 7/00* (2006.01)
*H02J 7/02* (2016.01)

(52) U.S. Cl.
CPC ............ *H02J 7/0044* (2013.01); *H02J 7/025* (2013.01)

(58) Field of Classification Search
CPC .... H02J 7/0042; H02J 7/70044; H02J 7/0045; H02J 7/0029; H02J 50/10
USPC .......................... 320/107, 108, 111, 114, 115
See application file for complete search history.

(56) References Cited

U.S. PATENT DOCUMENTS

| | | | |
|---|---|---|---|
| 7,667,433 B1 * | 2/2010 | Smith ................. | H04B 1/3883 320/115 |
| 8,575,887 B1 * | 11/2013 | Pomare ................ | H02J 7/0044 320/101 |
| 9,948,120 B2 | 4/2018 | Chan et al. | |
| 2014/0002004 A1 | 1/2014 | Farris-Gilbert et al. | |
| 2014/0085815 A1 * | 3/2014 | Filipovic ................ | G06F 1/163 361/679.56 |
| 2015/0256021 A1 * | 9/2015 | Kwon ................... | H02J 7/0042 320/108 |
| 2016/0261133 A1 * | 9/2016 | Wang ...................... | H02J 50/70 |

(Continued)

FOREIGN PATENT DOCUMENTS

CN 100352667 C 12/2007

*Primary Examiner* — Edward Tso
(74) *Attorney, Agent, or Firm* — Dickinson Wright RLLP

(57) ABSTRACT

Accessory devices for portable electronic devices are herein described. An accessory device may include a receptacle used to receive and carry an electronic device. Further, the accessory device may include a cover that is pivotally coupled to the receptacle. The cover is designed to protect a front surface of the electronic device, including a cover glass. The accessory device may further include a power supply (such as a battery) that is located on the cover. The power supply is designed to provide power to the electronic device, and subsequently charge a battery of the electronic device. The power supply can also provide power to different devices. In this regard, the accessory device may include an inductive charging coil that can inductively charge a battery of a device located on the accessory device. The inductive charging coil can be integrated into the receptacle or the cover.

20 Claims, 12 Drawing Sheets

(56) References Cited

U.S. PATENT DOCUMENTS

2017/0170678 A1* 6/2017 Uhm .................. H02J 7/00308
2018/0128438 A1* 5/2018 Sreshta ................ F21V 17/007

* cited by examiner

ACCESSORY CASE WITH A POWER SUPPLY

CROSS-REFERENCE TO RELATED APPLICATION(S)

This application claims the benefit of priority to U.S. Provisional Application No. 62/834,312, filed on Apr. 15, 2019, titled "ACCESSORY CASE WITH A POWER SUPPLY," the disclosure of which is incorporated herein by reference in their entirety.

FIELD

The following description relates to accessory devices suitable for use with electronic devices, such as portable electronic devices. In particular, the following description relates to folios that include a case and a cover that can pivot relative to the receptacle. The case provides the accessory device with a space or volume to carry the electronic device, while the cover carries a power supply, or battery, and can pivot to cover the receptacle.

BACKGROUND

Accessory devices can include a battery located on a back wall of the accessory device. At this location, the battery is generally behind an electronic device positioned in the accessory device such that the device display is not obstructed. While the accessory device battery provides charging capability to a battery located in the electronic device, the location of the accessory device battery may provide some limitations and drawbacks. For example, electronic devices are known to include antennae for circuitry that supports multiple wireless communication functions. In some instances, the accessory device battery can interfere with the ability of the antennae to transmit and receive wireless communication. As a result, the location of the antennae in the electronic device can limit the accessory device battery in terms of the size and the location. Alternatively, the location of the accessory device battery on the back of the accessory device may require alterations to the design layout of the electronic device, which leads to additional engineering testing and associated changes.

SUMMARY

In one aspect, an accessory device for use with an electronic device is described. The accessory device may include a receptacle having a size and shape to receive the electronic device. The accessory device may further include a cover coupled to the receptacle by a hinge that allows the cover to pivot with respect to the receptacle. The accessory device may further include a power supply carried by the cover. The power supply can be electrically coupled with the electronic device when the electronic device is retained in the receptacle In another aspect, accessory device for use with an electronic device is described. The accessory device may include a first portion that defines an internal volume that is capable of receiving the electronic device. The accessory device may further include a second portion coupled to the first portion by a hinge. The second portion may carry a power supply. In some instances, a closed position may include the second portion covering the internal volume. Further, in some instances, an open position may include i) the first portion being uncovered by the second portion and ii) the power supply being laterally displaced with respect to the first portion.

In another aspect, an accessory device for use with an electronic device is described. The accessory device may include a receptacle that includes a bottom wall and sidewalls that extend from the bottom wall. The sidewalls can combine with the bottom wall to define an internal volume capable of receiving the electronic device. The accessory device may further include a front cover pivotally coupled with the receptacle by a hinge. The accessory device may further include a power supply embedded in the front cover. The power supply can be configured to provide power to a battery of the electronic device. The accessory device may further include an electrical contact positioned on the receptacle and electrically coupled to the power supply. In some instances, receipt of the electronic device in the receptacle is capable of causing the electronic device to electrically couple to the electrical contact.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
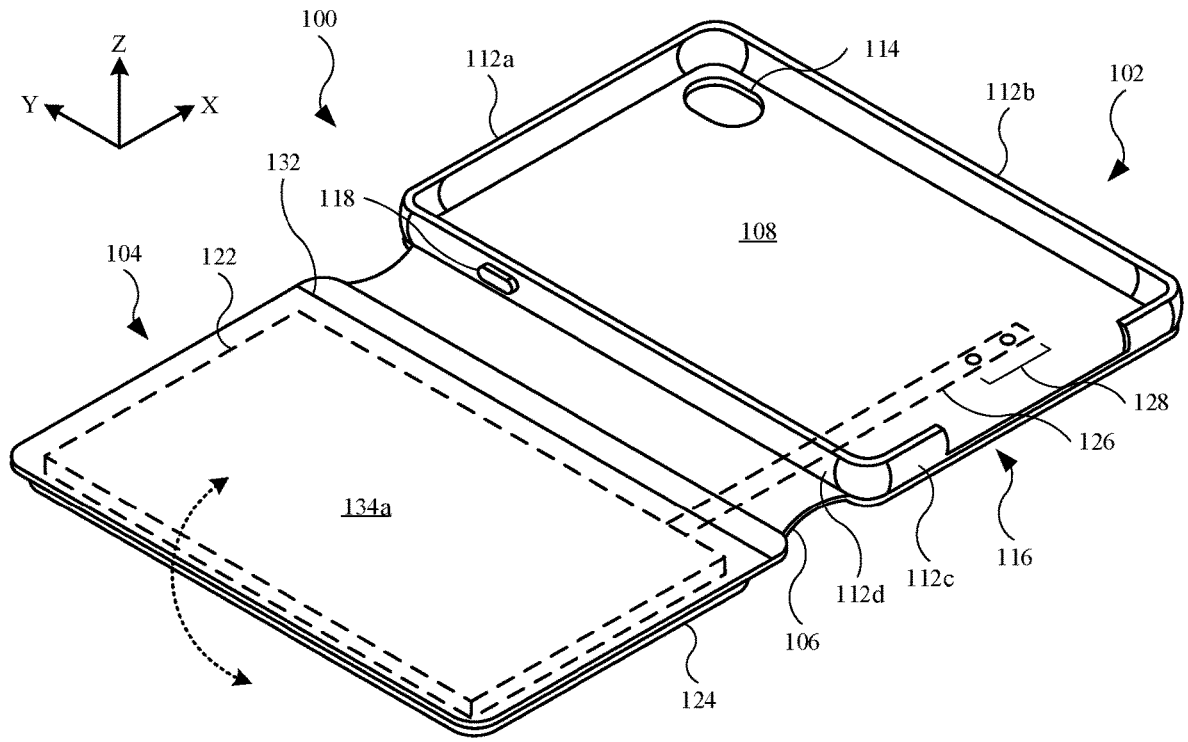
FIG. 1 illustrates a front isometric view of an embodiment of an accessory device, showing the accessory device in an open position, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory devices suitable for use with electronic devices, including portable electronic devices such as mobile wireless communication devices and tablet computing devices. Accessory devices described herein may refer to a folio that includes both a case that forms a receptacle for receipt of the electronic device, as well as a cover that can pivot, or rotate, relative to the case. As an example, the cover can be positioned over the case (including the receptacle) to cover/conceal the electronic device, including a display of the electronic device. In this manner, the accessory device provides a protective outer body for the electronic device and its components.

Additionally, accessory devices described herein may include a power supply, or battery, that stores energy. In some exemplary embodiments, the stored energy can be used to charge a battery of the electronic device and/or a battery of a user accessory placed on or in the accessory device. Further, unlike traditional accessory devices that integrate the power supply with the case, accessory devices described herein integrate the power supply with the cover. As a result, movement of the cover can position the power supply away from the electronic device in accordance with the location of the cover, as opposed to traditional accessory devices that include a battery positioned behind the electronic device regardless of the position of the cover. For example, when the electronic device is in the case of the accessory device, the cover (including the power supply) can pivot relative to the case, and accordingly, the power supply can be rotated away and laterally displaced from the electronic device.

Accessory devices described herein provide several benefits. For example, when the accessory device is in an open position, the power supply is positioned away from internal components of the electronic devices, such as antennae used for wireless communication. This can eliminate or reduce interference caused by the power supply and its associated circuitry. Further, as electronic devices commonly include a camera(s) located along the housing of the electronic device, traditional accessory devices require dedicated space in the back wall of the case for the camera(s), thereby limiting the available space for the power supply. However, due to the location of the power supply on the cover, accessory devices described herein can provide a power supply (or in some cases, power supplies) that occupies a substantial surface area of the cover, as the case does not need to accommodate the power supply.

In addition to cameras, electronic devices are known to include a camera flash module that provides additional light during an image capturing event. Traditional accessory devices include a power supply in an extension, or hump, on the back wall. As a result, at least some of the light emitted from the camera flash module can reflect off of the extension and into the camera, causing the resultant image generated by the camera to include a color that resembles the color of the accessory device. However, for accessory devices described herein, light from a camera flash reflected back toward the camera is not intermittently reflected off of the accessory device, as the power supply (and associated extension that carries the power supply) is positioned on the cover away from the camera.

In another example, electronic devices are known to include an inductive charging coil(s) used for wireless charging of a battery of the electronic device. A traditional accessory device with a power supply on the back wall of the accessory device can block the transmission of inductive energy do the inductive charging coil(s). However, with the power supply located on the cover, accessory devices described herein include a power supply that is laterally displaced from the inductive charging coil(s) in the electronic device. As a result, accessory device described herein will not impede transmission of inductive energy from an external charging device to the electronic device even when the electronic device is positioned in the case.

These and other embodiments are discussed below with reference to FIGS. 1-21. However, those skilled in the art will readily appreciate that the detailed description given herein with respect to these Figures is for explanatory purposes only and should not be construed as limiting.

FIG. 1 illustrates a front isometric view of an embodiment of an accessory device 100, showing the accessory device 100 in an open position, in accordance with some described embodiments. The accessory device 100 (representative of other accessory devices described herein) is designed for use with an electronic device (not shown in FIG. 1), such as portable electronic devices including mobile wireless communication devices (smartphones) and tablet computing devices, as non-limiting examples. Also, the accessory device 100 may be referred to as a protective case or a folio, as non-limiting examples. The accessory device 100 may be formed from materials such as silicone, leather, synthetic materials, plastic, microfiber, or a combination thereof. When the accessory device 100 includes leather, the accessory device 100 may include two or more outer layers formed from leather that define an exterior of the accessory device 100.

As shown, the accessory device 100 includes a receptacle 102 and a cover 104 connected to the receptacle 102 by a hinge 106. The hinge 106 allows relative movement between the receptacle 102 and the cover 104. As an example, the cover 104 can pivot relative to the receptacle 102, as indicated by the two-sided arrow. Also, the cover 104 is designed to rotate, using the hinge 106, onto the receptacle 102, including multiple sidewalls (described below) of the receptacle 102. However, as shown in FIG. 1, the cover 104 is rotated away from the receptacle 102 and is positioned laterally respect to the receptacle 102. In this detailed description and in the claims, the phrase "positioned laterally" or "laterally displaced" refers to the cover 104 folded away 180 degrees (or approximately 180 degrees) from the receptacle 102 such that the cover 104 and the receptacle lie on the same plane (such as the X-Y plane in Cartesian coordinates). In some instances, the receptacle 102 may be referred to as a first portion or a case, and the cover 104 may be referred to as a second portion, a flap, or a front flap.

The receptacle 102 provides a region in which the electronic device is positioned. The receptacle 102 may include a wall 108 (also referred to as a bottom wall or back wall) as well as multiple sidewalls, including a sidewall 112a, a sidewall 112b, a sidewall 112c, and a sidewall 112d. The multiple sidewalls extend from the wall 108 to form space, region, or internal volume in which the electronic device is positioned. In this regard, the internal volume includes a size and shape that corresponds to the size and shape of the electronic device. The receptacle 102 includes additional features to accommodate an electronic device. For example, the wall 108 includes an opening 114 that provides an unobstructed pathway for a camera(s) and a camera flash (not shown in FIG. 1) of an electronic device. The sidewall 112c includes a cut out region 116 that provides an unobstructed pathway for a microphone(s), speaker(s), and a data port (not shown in FIG. 1) of the electronic device. The sidewall 112d may include a button 118 that can be depressed in order to provide a corresponding depression of a button (not shown in FIG. 1) of the electronic device. Although the button 118 is in a particular location on the sidewall 112d, the button 118 can be positioned in other locations of the sidewall 112d or on other sidewalls.

The accessory device 100 may include a power supply 122 (shown as dotted lines) located on, and carried by, the cover 104. The power supply 122, also referred to as a battery, rechargeable battery rechargeable power supply, is designed to store energy that can be used to charge a battery of an electronic device positioned in the receptacle 102. The cover 104 may include a compartment 124 that defines an enclosure in which the power supply 122 is located. In order to place an electronic device in electrical communication with the power supply 122, the accessory device 100 may include a flexible circuit 126 (shown as dotted lines) that electrically connects to the power supply 122. As shown, the flexible circuit 126 is embedded in the cover 104, the hinge 106, and the receptacle 102. The receptacle 102 may include contacts 128 located on the wall 108. When an electronic device is positioned in the receptacle 102, the contacts 128 can engage and electrically couple to respective contacts (not shown in FIG. 1) located on the electronic device. While the contacts 128 represent multiple electrical contacts, in some embodiments (not shown in FIG. 1), the accessory device 100 includes a single electrical contact. Although not shown, the accessory device 100 may include additional circuitry, indicators (lights), and other features that operate in conjunction with the power supply 122.

The cover 104 may further include a sleeve 132 designed to carry personal items for a user, such as a driver's license or credit cards, as non-limiting examples. Accordingly, the accessory device 100 may be used as a wallet. Generally, the sleeve 132 defines a surface 134a that engages the sidewalls of the receptacle 102, while an additional surface (shown below) of the cover 104 receives the compartment 124.

Figure 2:
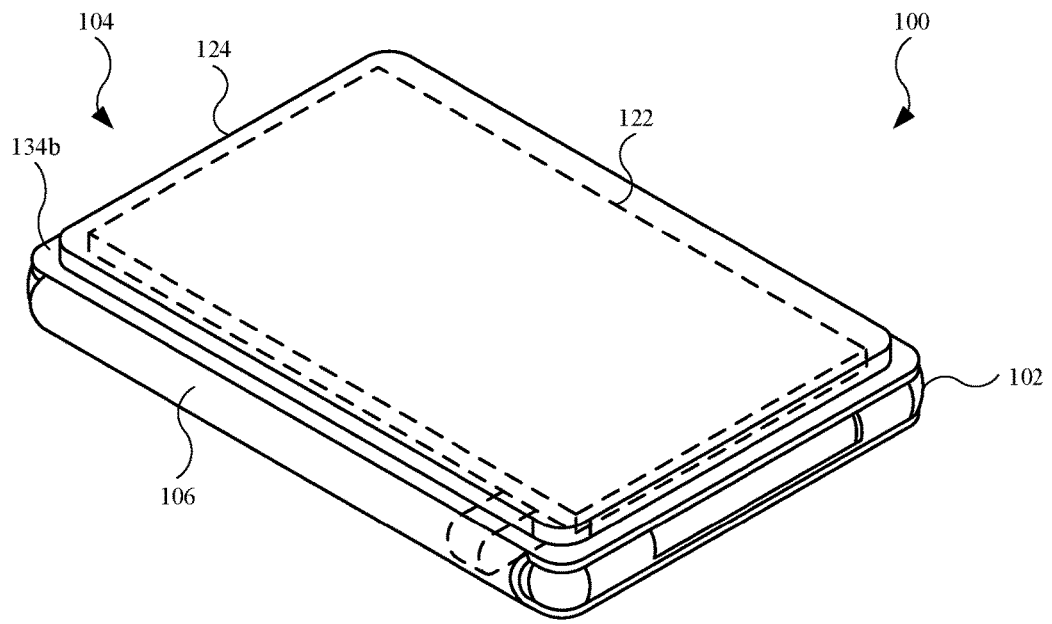
FIG. 2 illustrates a front isometric view of the accessory device shown in FIG. 1, showing the accessory device in a closed position.

FIG. 2 illustrates a front isometric view of the accessory device 100 shown in FIG. 1, showing the accessory device 100 in a closed position. To transition from the open position to the closed position, the cover 104 is rotated, using the hinge 106, and positioned on the receptacle 102, including the aforementioned sidewalls (labeled in FIG. 1) of the receptacle 102. Further, the compartment 124, which includes the power supply 122, is located on a surface 134b of the cover 104, with the surface 134b being opposite the surface 134a (shown in FIG. 1).

The accessory device 100 shown and described in FIGS. 1 and 2 provides several advantages. For example, when the accessory device 100 is in the open position shown in FIG. 1, the power supply 122 is laterally displaced relative an electronic device in the receptacle 102. As a result, interference causes by the power supply 122 (in the form of signal blocking or radio frequency interference) is minimized or prevented. In other words, an electronic device positioned in the receptacle 102 may transmit wireless communication through the wall 108 without interference issues caused by the power supply 122. Also, due to the cover 104 carrying the power supply 122 (as opposed to the receptacle 102), the power supply 122 can span a substantial region of the surface 134b of the cover 104, as the size of the power supply 122 is not limited due to any openings or other features that accommodate the electronic device. As a result, the size of the power supply 122, and associated amount of energy storage, may be greater than power supplies integrated with traditional accessory devices, as the space provided by the surface 134b generally includes no other features to accommodate the electronic device. Also, some electronic devices include wireless charging capabilities. For example, an electronic device may include an inductive charging receiver coil capable of receiving energy transfer through magnetic induction. With the power supply 122 located on the cover 104, as opposed to the wall 108, the accessory device 100 provides minimal, if any, interference with the inductive energy transfer through the wall 108.

Further, in the closed position shown in FIG. 2, the power supply 122 and the compartment 124 provide protection, in addition to the cover 104, for a transparent protective layer (not shown in FIG. 2), or cover glass, of an electronic device. Accordingly, multiple structural components can cover the transparent protective layer, thereby increasing the amount of protection provided to the transparent protective layer. Also, in the closed position, while the power supply 122 is relatively closer to an electronic device positioned in the receptacle 102, the electronic device is generally surrounded (and subsequently protected) by both the receptacle 102 and the cover 104, and thus, is not in use by a user. As a result, wireless communication issues related to potential interference caused by the power supply 122 in the closed position are generally inconsequential.

Figure 3:
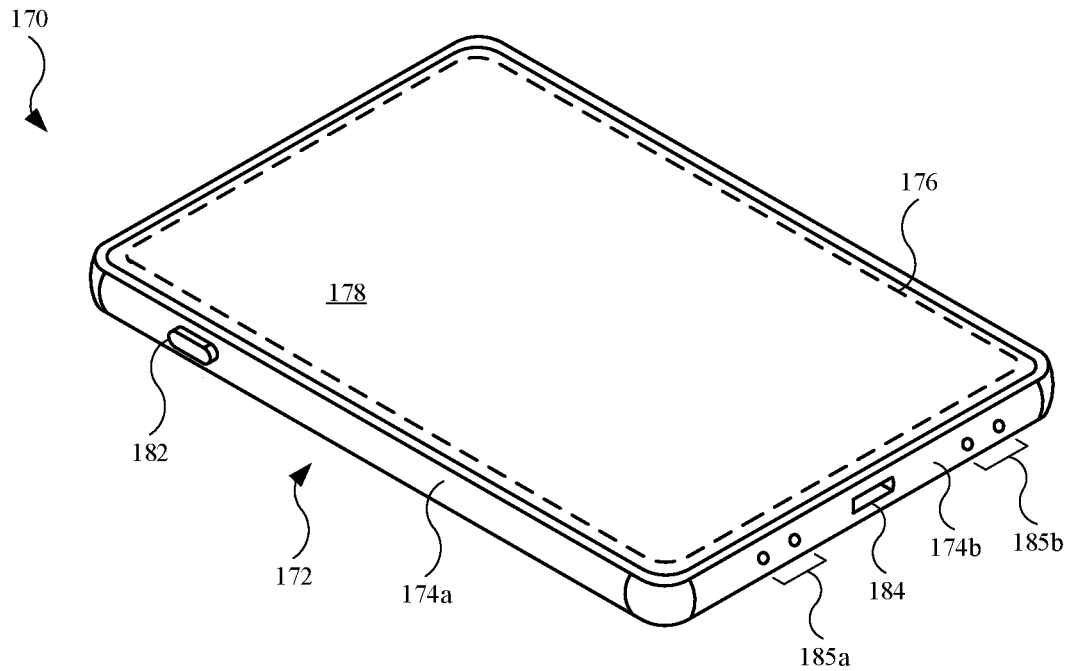
FIG. 3 illustrates a front isometric view of an embodiment of an electronic device, in accordance with some described embodiments.

FIG. 3 illustrates a front isometric view of an embodiment of an electronic device 170, in accordance with some described embodiments. The electronic device 170 may include a portable electronic device, such as a mobile wireless communication device or a tablet computing device. The electronic device 170 is suitable for use with the accessory device 100 (shown in FIGS. 1 and 2), as well as other accessory devices described herein. The electronic device 170 may include an enclosure 172, or housing, that stores several components of the electronic device 170, such as processing circuitry, memory circuitry, a battery, a speaker, a microphone, and flexible circuitry and cables that electrically connect the aforementioned components to each other. The enclosure 172 may include a wall (not shown in FIG. 3) and several sidewalls, such as a sidewall 174a and a sidewall 174b. In some embodiments, the sidewalls include a metal, such as stainless steel (as a non-limiting example), and the wall includes a non-metal, such as glass. The size and shape of the receptacle 102 (shown in FIG. 1) of the accessory device 100 corresponds to the size and shape of the enclosure 172.

The electronic device 170 may include a display 176 (shown as a dotted line) designed to present visual information in the form of still images, motion images, and/or textual information. The electronic device 170 may further include a transparent layer 178 that covers the display 176. The display 176 may include a display layer that presents the visual information. The display 176 further includes a touch input layer that allows a user to touch the transparent layer 178 and provide a touch input representing a command received by components of the electronic device 170. The transparent layer 178 may provide a protective cover for the display 176, and may include a material such as glass, sapphire, plastic, or the like.

The electronic device 170 may further include a button 182 that can be actuated by a user to provide a touch input to the electronic device 170. When the electronic device 170 is positioned in the receptacle 102 (shown in FIG. 1), the button 118 (shown in FIG. 1) of the accessory device 100 is aligned with the button 182. The electronic device 170 may further include a data port 184 that can electrically and mechanically connect to a connector of a cable assembly (not shown in FIG. 3). In this manner, the electronic device 170 may use the data port 184 to receive power, as well as send and receive data to and from, respectively, the cable assembly when the cable assembly is coupled to an external electronic device (not shown in FIG. 3). Also, the electronic device 170 may further include openings 185a and openings 185b formed in the sidewall 174b. The openings 185a and openings 185b provide an unobstructed pathway for acoustical components (not shown in FIG. 3) of the electronic device 170, such as microphones and speaker modules.

Figure 4:
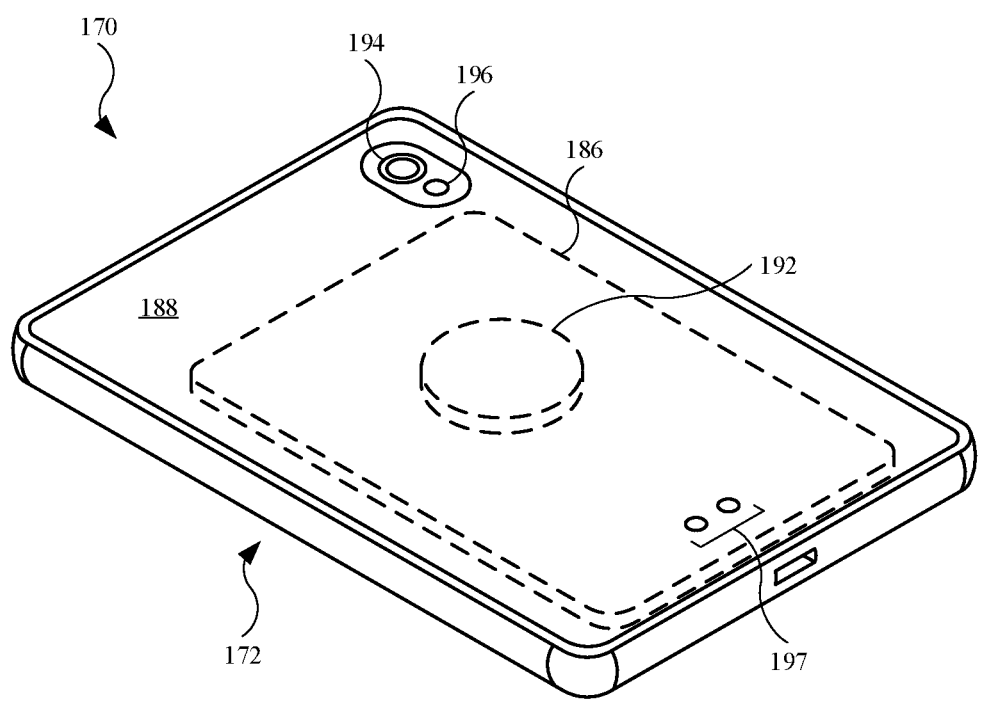
FIG. 4 illustrates a rear isometric view of the electronic device shown in FIG. 3, showing additional features of the electronic device.

FIG. 4 illustrates a rear isometric view of the electronic device 170 shown in FIG. 4, showing additional features of the electronic device 170. For example, the electronic device 170 includes a power supply 186 designed to store and provide energy to components (of the electronic device 170). The electronic device 170 further includes a wall 188 that combines with the aforementioned sidewalls to define the enclosure 172. The wall 188 may include non-metals, as described above. In this regard, the electronic device 170 may include an inductive charging module 192 that includes an inductive charging receiver coil designed to receive energy (through electromagnetic or magnetic induction) that is used to charge the power supply 186. As a non-metal, the wall 188 provides minimal, if any, impedance of energy transmitted by an inductive charging station (not shown in FIG. 4) to the inductive charging module 192. The electronic device 170 may further include a camera module 194 designed to capture images of an object or objects external to the electronic device 170. The electronic device 170 may further include a flash module 196 designed to provide additional light to the object(s) during an image capturing event by the camera module 194. Also, the electronic device 170 may include contacts 197 designed to electrically couple with contacts of an accessory device 100 (such as the contacts 128 shown in FIG. 1). The contacts 197 support data transmission and power to internal components of the electronic device 170.

FIGS. 5-19 show and describe additional embodiments of accessory devices. Although not all structures, features, and functions are explicitly described, the accessory devices shown and described in FIGS. 5-19 may include several (and in some cases, all) components and associated features shown and described for the accessory device 100 in FIGS. 1 and 2. Further, the accessory devices shown and described in FIGS. 5-19 can be used with the electronic device 170 shown in FIGS. 3 and 4.

Figure 5:
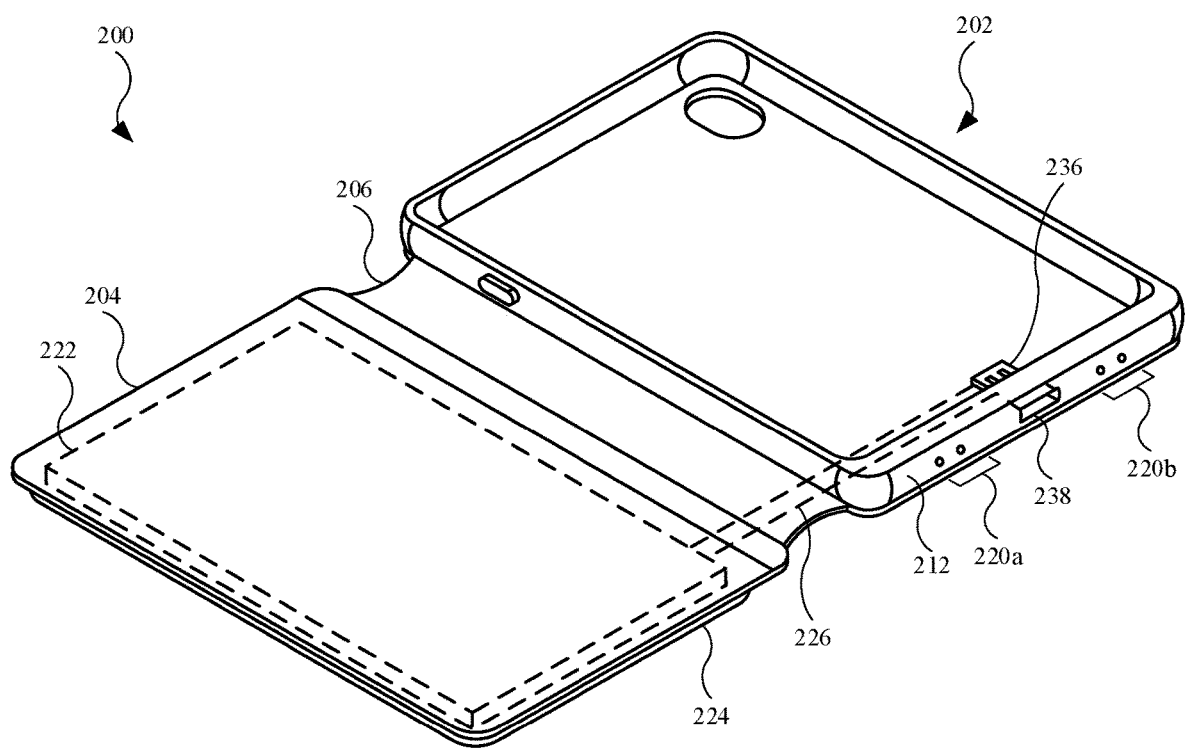
FIG. 5 illustrates a front isometric view of an alternate embodiment of an accessory device, showing the accessory device with a connector, in accordance with some described embodiments.

FIG. 5 illustrates a front isometric view of an alternate embodiment of an accessory device 200, showing the accessory device 200 with a connector 236, in accordance with some described embodiments. The accessory device 200 includes a receptacle 202 designed to receive and carry an electronic device (not shown in FIG. 5). The accessory device 200 further includes a cover 204 that is connected to the receptacle 202 by a hinge 206. The receptacle 202 includes a sidewall 212 on which the connector 236, or plug, is located. The sidewall 212 may include openings 220a and openings 220b to provide an acoustical pathway for speaker modules and/or microphones (not shown in FIG. 5) of an electronic device. The openings 220a and openings 220b align with the openings 185a and the openings 185b, respectively, of the electronic device 170 (shown in FIG. 3).

When an electronic device is positioned in the receptacle 202, the connector 236 electrically and mechanically couples to a data port (such as the data port 184, shown in FIG. 3). Also, the accessory device 200 includes a port 238 that can electrically and mechanically connects to a connector of a cable assembly (not shown in FIG. 5). The port 238 is electrically coupled to the connector 236. Accordingly, the connector 236 can transmit, to an electronic device in the receptacle 202, power and data received by the port 238.

The cover 204 includes a power supply 222 (shown as dotted lines) and a compartment 224 that stores the power supply 222. Further, the accessory device 200 may include a flexible circuit 226 (shown as dotted lines) that electrically connects to the power supply 222 and the connector 236. As shown, the flexible circuit 226 extends from (and is embedded in) the cover 204 into the receptacle 202. The flexible circuit 226 is also embedded in the hinge 206. When an electronic device is positioned in the receptacle 202, the connector 236 is in electrical communication with the electronic device and the power supply 222 can provide energy to charge a power supply of the electronic device (such as the power supply 186 shown in FIG. 3).

Figure 6:
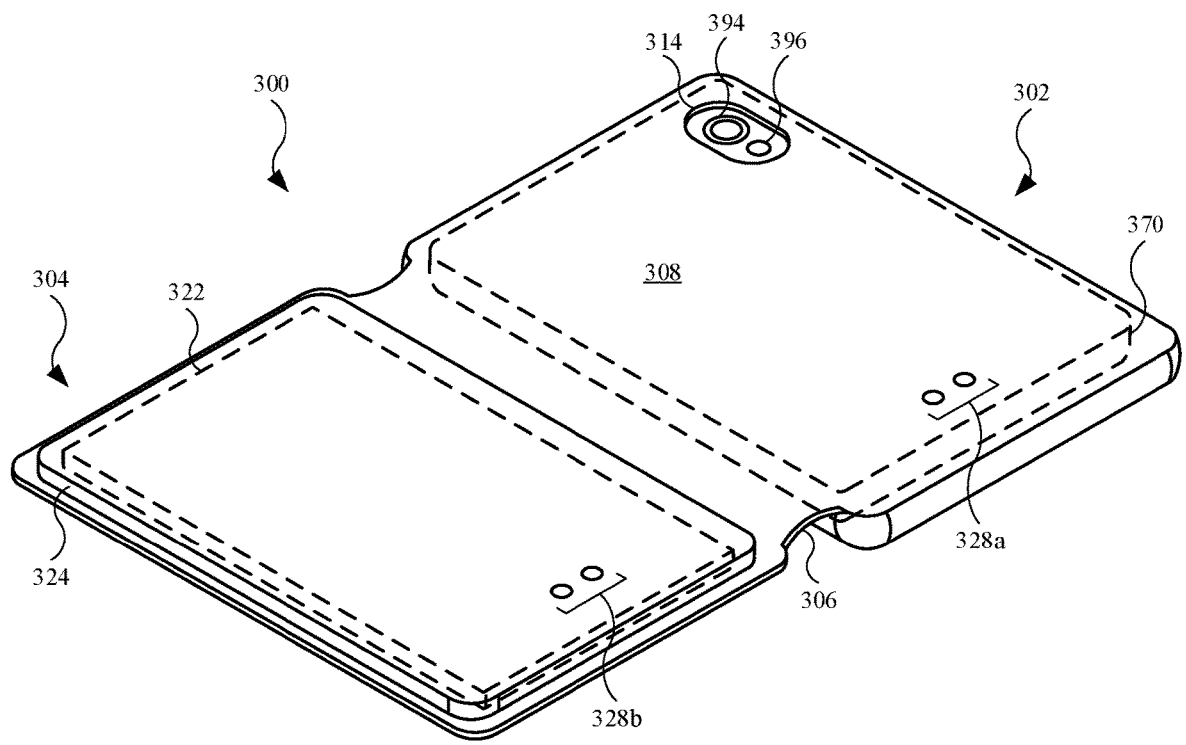
FIG. 6 illustrates a rear isometric view of an embodiment of an accessory device and an electronic device positioned in the accessory device, in accordance with some described embodiments.

FIG. 6 illustrates a rear isometric view of an embodiment of an accessory device 300 and an electronic device 370 positioned in the accessory device 300, in accordance with some described embodiments. As shown, the accessory device 300 includes a receptacle 302 designed to receive and carry the electronic device 370. The accessory device 300 further includes a cover 304 that is connected to the receptacle 302 by a hinge 306. The cover 304 includes a power supply 322 and a compartment 324 that stores the power supply 322.

The receptacle 302 may include contacts 328*a* designed to electrically couple with respective contacts of an external device (not shown in FIG. 6), such as a power supply or external electronic device. In this regard, when the electronic device 370 is positioned in the receptacle 302, the accessory device 300 can receive power and data, via the contacts 328*a*, and transmit the power and data to the electronic device 370. Although not shown, the accessory device 300 may include contacts (similar to the contacts 128, shown in FIG. 3) or a connector (similar to the connector 236, shown in FIG. 5), as well as associated circuitry and cables to electrically couple these devices to the power supply 322 and/or the contacts 328*a*.

The cover 304 may include contacts 328*b* designed to electrically couple with respective contacts of an external device (not shown in FIG. 6), such as a power supply. The contacts 328*b* can be electrically coupled to the power supply 322, and accordingly, the external device can provide energy, via the contacts 328*b*, to the power supply 322. Although not shown, the accessory device 300 may include a single set of contacts on either the receptacle 302 and/or the cover 304, with the single set of contacts providing all of the functions described for the contacts 328*a* and the contacts 328*b*.

Also, the receptacle 302 includes a wall 308 with an opening 314 for a camera module 394 and a flash module 396 of the electronic device 370. Due to the power supply 322 and the compartment 324 being laterally displaced from the electronic device 370, as shown in FIG. 6, light provided by the flash module 396 is not reflected from an object (not shown in FIG. 6), the image of which being captured by the camera module 394, and onto structural elements of the accessory device 300. As a result, the light is not reflected of off the accessory device 300 (including the wall 308), and an image captured by the camera module 394 does not include undesired effects, such as a color or tint of the accessory device 300 applied to the image.

Figure 7:
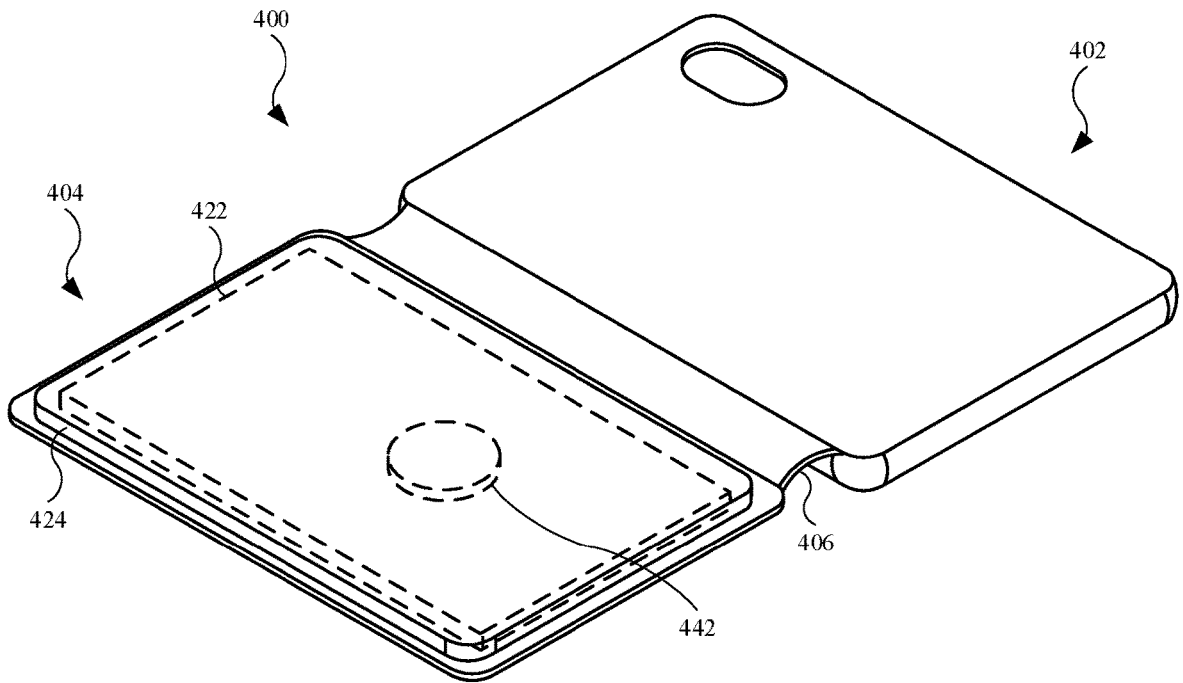
FIG. 7 illustrates a rear isometric view of an alternate embodiment of an accessory device, showing the accessory device with charging modules, in accordance with some described embodiments.

FIG. 7 illustrates a rear isometric view of an alternate embodiment of an accessory device 400, showing the accessory device 400 with a charging module 442, in accordance with some described embodiments. The accessory device 400 includes a receptacle 402 designed to receive and carry an electronic device (not shown in FIG. 7). The accessory device 400 further includes a cover 404 that is connected to the receptacle 402 by a hinge 406. The cover 304 includes a power supply 422 and a compartment 424 that stores the power supply 422.

The charging module 442, located on the cover 404, may include an inductive charging module. In this regard, the charging module 442 may include an inductive charging receiver coil designed to receive energy (through electromagnetic or magnetic induction) that is used to charge the power supply 422. Although the charging module 442 is located on the cover 404 of the accessory device 400, in some embodiments (not shown in FIG. 7), the charging module 442 is located on the receptacle 402.

Figure 8:
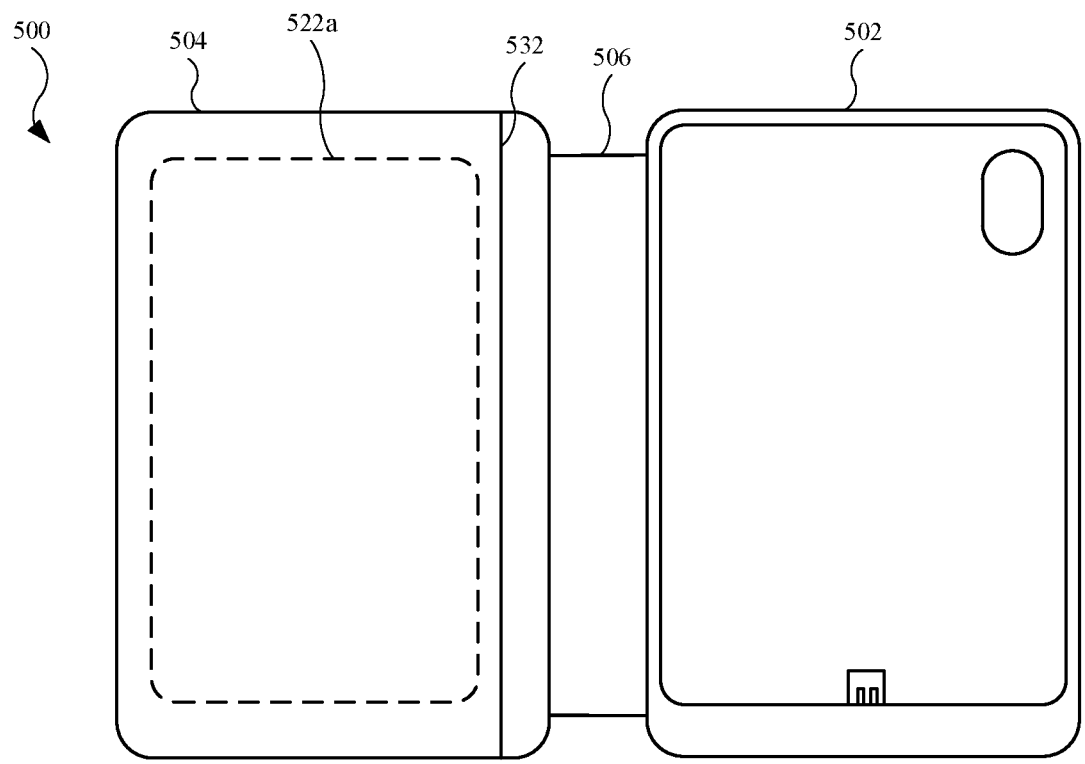
FIG. 8 illustrates a plan view of an embodiment of an accessory device, showing the accessory device with a cover that holds a power supply that is removable from the cover, in accordance with some described embodiments.

FIG. 8 illustrates a plan view of an embodiment of an accessory device 500, showing the accessory device 500 with a cover 504 that holds a power supply 522*a* that is removable from the cover 504, in accordance with some described embodiments. As shown, the accessory device 500 includes a receptacle 502 designed to receive and carry an electronic device (not shown in FIG. 8). The cover 504 is connected to the receptacle 502 by a hinge 506. The cover 504 includes a power supply 522*a* and a sleeve 532 in which the power supply 522*a* is positioned.

The power supply 522*a* is designed as a removable power supply. In this regard, the power supply 522*a* may be removed from the accessory device 500 by pulling the power supply 522*a* out of the sleeve 532. The power supply 522*a* may be removed for multiple reasons. For example, when the power supply 522*a* is in a relatively low charge/energy state, the power supply 522*a* may be removed and replaced with a different power supply that is fully charged, or at least in a relatively higher charge/energy state as compared to the power supply 522*a*. This can reduce downtime associated with charging the power supply 522*a*. It should be noted that, although not shown, the accessory device 500 can include a compartment (similar to the compartment 124 shown in FIG. 2) that is used to hold the power supply 522*a*, rather than the sleeve 532.

Figure 9:
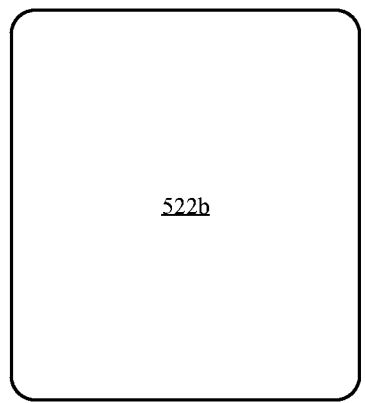
FIG. 9 illustrates an alternate embodiment of a power supply that can be used with the accessory device shown in FIG. 8.
Figure 10:
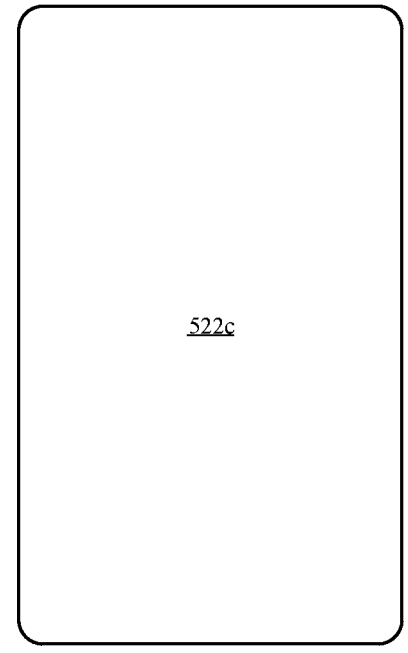
FIG. 10 illustrates an alternate embodiment of a power supply that can be used with the accessory device shown in FIG. 8.

FIGS. 9 and 10 illustrate alternate embodiments of a power supply that can be used with the accessory device 500 shown in FIG. 8. The power supplies shown in FIGS. 9 and 10 can be substituted/interchanged with the power supply 522*a* shown in FIG. 8.

FIG. 9 illustrates a power supply 522*b* that is smaller than the power supply 522*a* shown in FIG. 8. While the power supply 522*b* may provide less energy storage as compared to the power supply 522*a*, the power supply 522*b* occupies less space in the sleeve 532 (shown in FIG. 8) as compared to the power supply 522*a*, resulting in additional space for the sleeve 532 to carry other items. FIG. 10 illustrates a power supply 522*c* that is larger than the power supply 522*a* shown in FIG. 8. As a result, the power supply 522*c* may include increased energy storage as compared to the power supply 522*a*.

Figure 11:
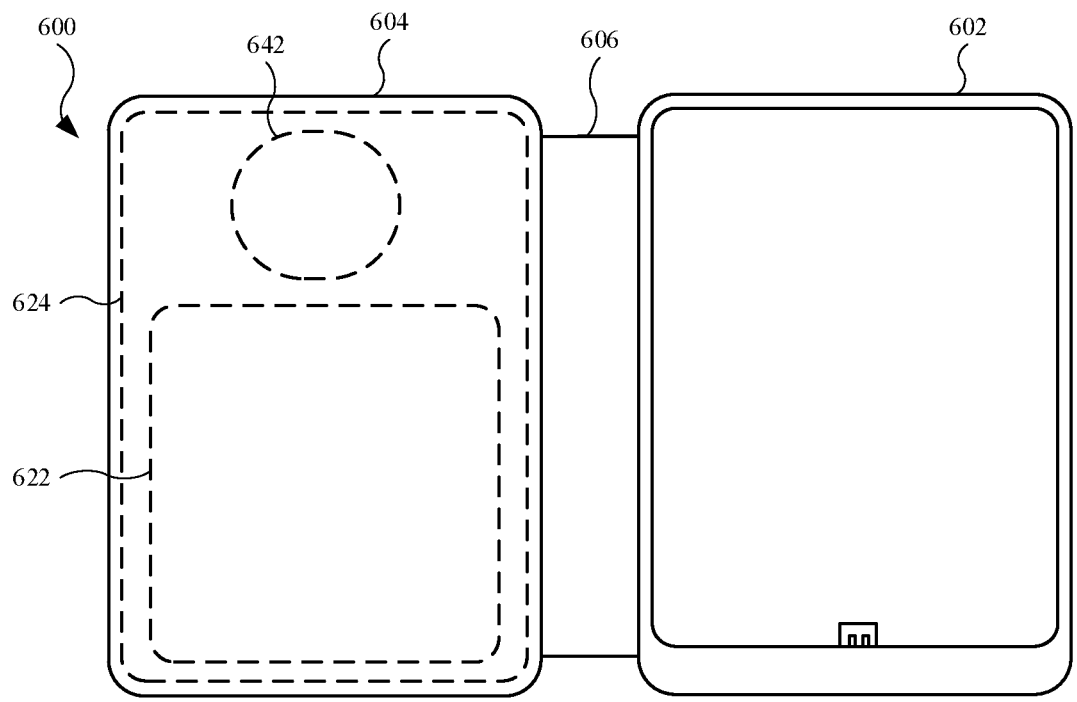
FIG. 11 illustrates a plan view of an embodiment of an accessory device, showing the accessory device with a cover that holds a power supply and a charging module, in accordance with some described embodiments.

FIG. 11 illustrates a plan view of an embodiment of an accessory device 600, showing the accessory device 600 with a cover 604 that holds a power supply 622 and a charging module 642, in accordance with some described embodiments. The accessory device 600 includes a receptacle 602 designed to receive and carry an electronic device (not shown in FIG. 11). The cover 604 is connected to the receptacle 602 by a hinge 606. The cover 604 includes a power supply 622 and a compartment 624 that holds the power supply 622 and the charging module 642.

In some embodiments, the charging module 642 is an inductive charging module that includes an inductive charging receiver coil designed to receive energy (through electromagnetic or magnetic induction) that is used to charge the power supply 622. Alternatively, in some embodiments, the charging module 642 is an inductive charging module that includes an inductive charging transmitter coil that receives energy from the power supply 622, and transmits the energy (through electromagnetic or magnetic induction) to an external device (not shown in FIG. 11) to charge a battery in the external device. As non-limiting examples, the external device may include a digital stylus that can provide into through interaction with a display of an electronic device, a wearable electronic device (such as a smart watch), wireless earphones, or an electronic device (such as a mobile wireless communication device). Still, in some embodiments, the charging module 642 includes a charging coil that acts as both an inductive charging receiver coil and an inductive charging transmitter coil.

Figure 12:
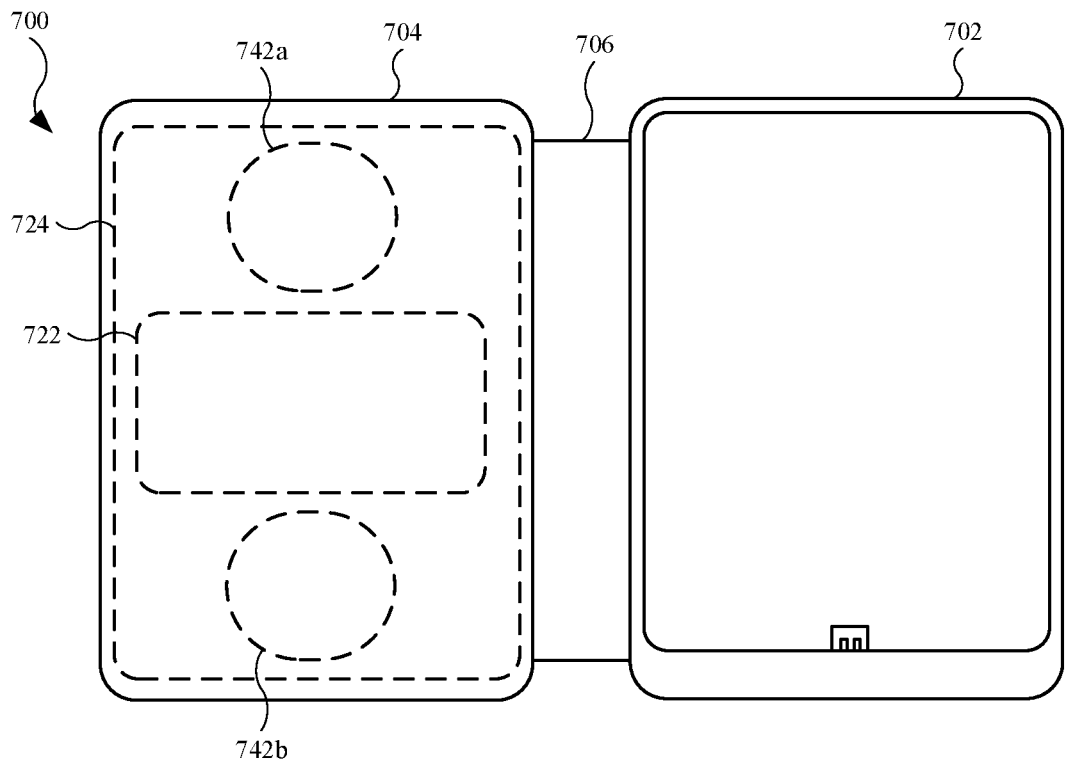
FIG. 12 illustrates a plan view of an embodiment of an accessory device, showing the accessory device with a cover that holds a power supply and multiple charging modules, in accordance with some described embodiments.

FIG. 12 illustrates a plan view of an embodiment of an accessory device 700, showing the accessory device with a cover 704 that holds a power supply 722 and multiple charging modules, in accordance with some described embodiments. The accessory device 700 includes a receptacle 702 designed to receive and carry an electronic device (not shown in FIG. 12). The cover 704 is connected to the receptacle 702 by a hinge 706. The power supply 722 is located on the cover 704. The cover 704 further includes a compartment 724 that holds the power supply 722, as well as a charging module 742a and a charging module 742b.

Figure 13:
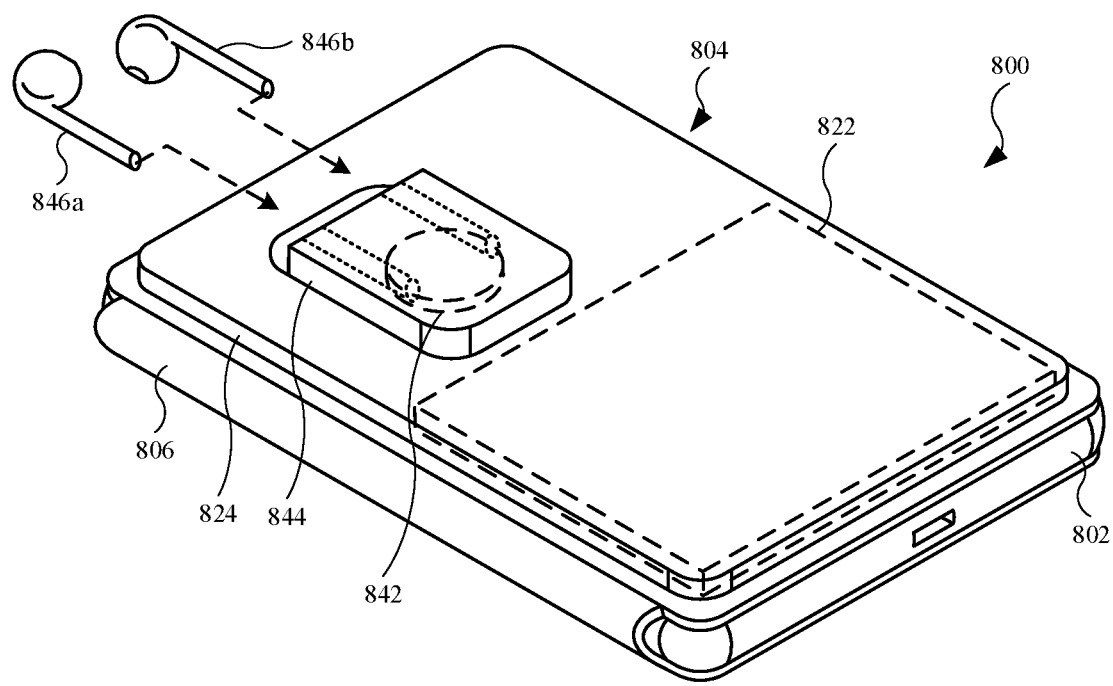
FIG. 13 illustrates a front isometric view of an alternate embodiment of an accessory device, showing the accessory device with a carrier that is capable of receiving user accessories, in accordance with some described embodiments.

FIG. 13 illustrates a front isometric view of an alternate embodiment of an accessory device 800, showing the accessory device 800 with a carrier 844 that is capable of receiving user accessories, in accordance with some described embodiments. The accessory device 800 includes a receptacle 802 designed to receive and carry an electronic device (not shown in FIG. 13). The accessory device 800 further includes a cover 804 that is connected to the receptacle 802 by a hinge 806. The cover 804 includes a power supply 822 and a compartment 824 that holds the power supply 822. The accessory device 800 may further include a charging module 842. As shown, the charging module 842 is located on the cover 804. However, in some embodiments (not shown in FIG. 13), the charging module 842 is located on the receptacle 802, such as along a back surface of a wall of the receptacle 802.

The carrier 844, or holster, is designed to receive the user accessories. As shown in FIG. 13, the user accessories include a wireless earphone 846a and a wireless earphone 846b, each of which can be at least partially inserted into a respective slot (not labeled) of the carrier 844. The wireless earphone 846a and the wireless earphone 846b are designed to connect to an electronic device (not shown in FIG. 13) through a wireless protocol, such as BLUETOOTH® (as a non-limiting example), and provide acoustical energy to a user in the form of audible sound. The charging module 842 may include an inductive charging transmitter coil that receives energy from the power supply 822, and transmits the energy (through electromagnetic or magnetic induction) to charge a respective battery in the wireless earphone 846a and the wireless earphone 846b.

Figure 14:
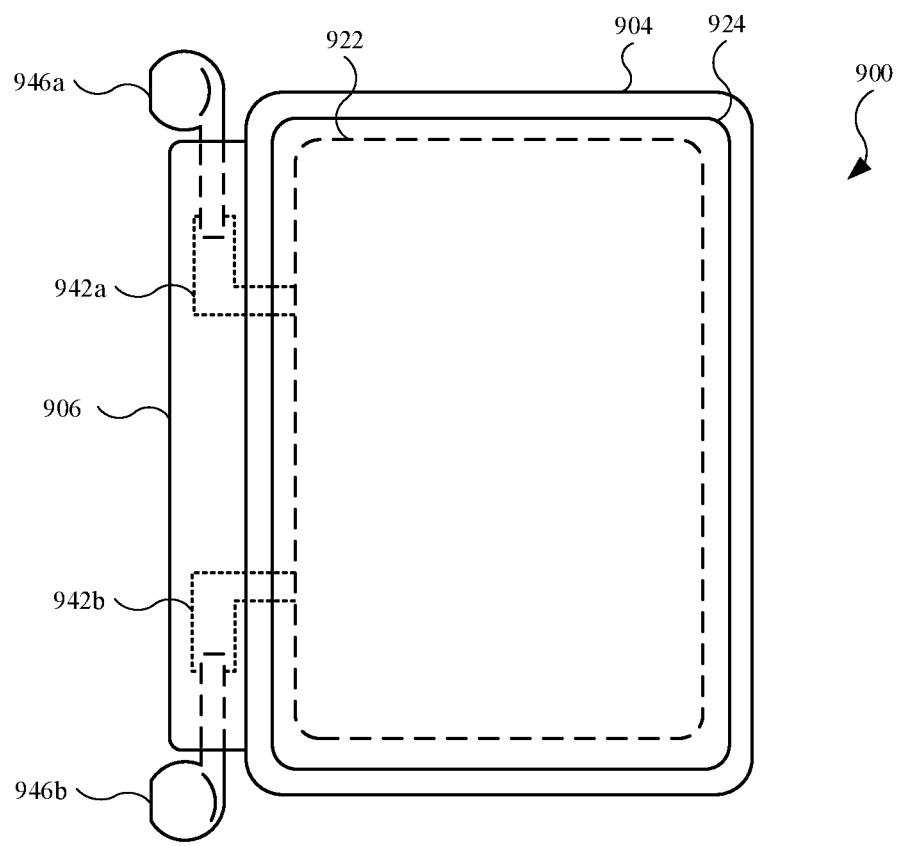
FIG. 14 illustrates a plan view of an alternate embodiment of an accessory device, showing the accessory device with a hinge that is capable of receiving user accessories, in accordance with some described embodiments.

FIG. 14 illustrates a plan view of an alternate embodiment of an accessory device 900, showing the accessory device with a hinge 906 that is capable of receiving user accessories, in accordance with some described embodiments. The accessory device 900 includes a receptacle (not shown in FIG. 14, but similar to prior embodiments) designed to receive and carry an electronic device (not shown in FIG. 14). The accessory device 900 further includes a cover 904 that is connected to the receptacle by the hinge 906. The cover 904 includes a power supply 922 and a compartment 924 that holds the power supply 922. The accessory device 900 may further include a charging module 942a and a charging module 942b. As shown, in a closed position (shown in FIG. 14) of the accessory device 900, the hinge 906 covers the charging module 942a and the charging module 942b. Although not shown, in some embodiments, the charging module 942a and the charging module 942b are integrated into the hinge 906.

The user accessories may include a wireless earphone 946a and a wireless earphone 946b that can be at least partially inserted into the charging module 942a and the charging module 942b, respectively. The charging module 942a and the charging module 942b may include an inductive charging transmitter coil that receives energy from the power supply 922, and transmits the energy (through electromagnetic or magnetic induction) that is used to charge a respective battery in the wireless earphone 946a and the wireless earphone 946b, respectively.

Figure 15:
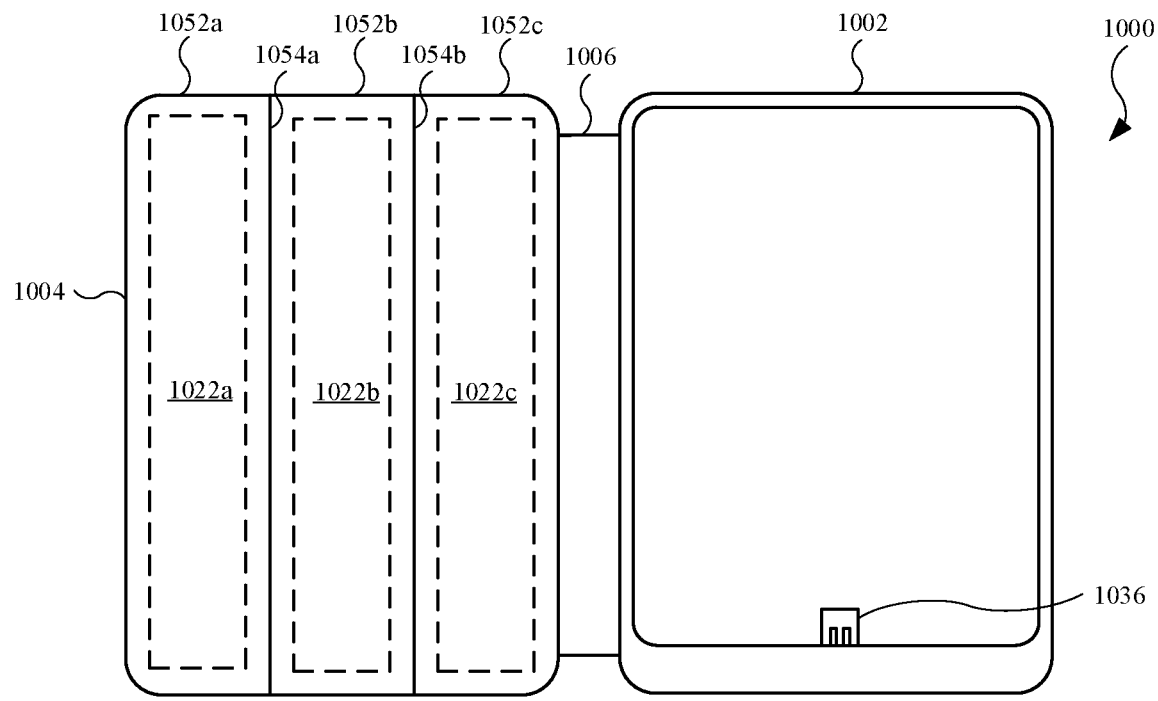
FIG. 15 illustrates a plan view of an alternate embodiment of an accessory device, showing the accessory device having a cover that includes multiple internal power supplies and several folding regions between the internal power supplies, in accordance with some described embodiments.

FIG. 15 illustrates a plan view of an alternate embodiment of an accessory device 1000, showing the accessory device 1000 having a cover 1004 that includes multiple internal power supplies and several folding regions between the internal power supplies, in accordance with some described embodiments. The accessory device 1000 includes a receptacle 1002 designed to receive and carry an electronic device (not shown in FIG. 15). The cover 1004 that is connected to the receptacle 1002 by a hinge 1006.

Rather than a single-structure power supply, the cover 1004 includes multiple power supply units, or multiple battery units. For example, the cover 1004 includes a power supply 1022a, a power supply 1022b, and a power supply 1022c. Similar to prior power supplies in accessory devices, the power supply 1022a, the power supply 1022b, and the power supply 1022c are designed to provide energy to an electronic device positioned in the receptacle 1002. Further, the power supply 1022a, the power supply 1022b, and the power supply 1022c are electrically connected to a connector 1036 of the accessory device 1000 by, for example, circuitry and/or cables (not shown in FIG. 15). The power supply 1022a, the power supply 1022b, and the power supply 1022c may be referred to as a first power supply, a second power supply, and a third power supply, respectively. However, in some embodiments (not shown), the connector 1036 is replaced by contacts (such as contacts 128, shown in FIG. 1).

Each power supply can be located in a segment, or partition, of the cover 1004. For example, the cover 1004 includes a segment 1052a, a segment 1052b, and a segment 1052c that carries the power supply 1022a, the power supply 1022b, and the power supply 1022c, respectively. The power supply 1022a, the power supply 1022b, and the power supply 1022c may be located in a respective compartment (not shown in FIG. 15) located on the segment 1052a, the segment 1052b, and the segment 1052c, respectively. Alternatively, the power supply 1022a, the power supply 1022b, and the power supply 1022c may be embedded between two or more layers of material that form an exterior of the segment 1052a, the segment 1052b, and the segment 1052c, respectively. These layers may include silicone, plastics, leather, synthetic materials, or a combination thereof, as non-limiting examples. Also, the segment 1052a, the segment 1052b, and the segment 1052c may be referred to as a first segment, a second segment, and a third segment, respectively.

The cover 1004 may include folding regions, or hinges, that separate the segments and allow relative movement between the segments. As shown, the cover 1004 includes a folding region 1054a that separates the segment 1052a from the segment 1052b, and allows relative movement between the segment 1052a and the segment 1052b. The cover 1004 further includes a folding region 1054b that separates the segment 1052b from the segment 1052c, and allows relative movement between the segment 1052b and the segment 1052c.

Figure 16:
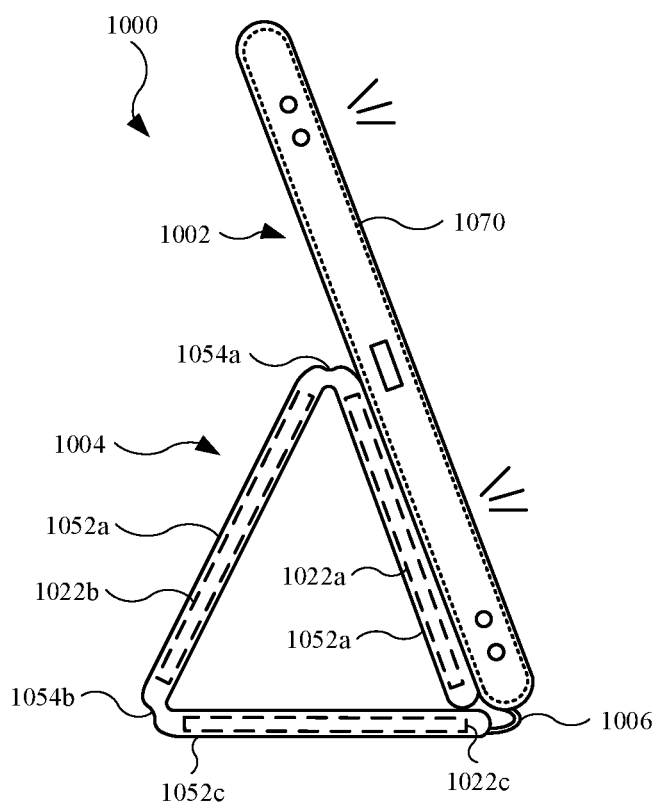
FIG. 16 illustrates a side view of the accessory device shown in FIG. 15, showing the cover forming a support for the receptacle and an electronic device in the receptacle, in accordance with some described embodiments.

FIG. 16 illustrates a side view of the accessory device 1000 shown in FIG. 15, showing the cover 1004 forming a support for the receptacle 1002 and an electronic device 1070 in the receptacle 1002, in accordance with some described embodiments. The electronic device 1070 may include any features described herein for an electronic device. As shown, the cover 1004 is folded at the folding region 1054a and the folding region 1054b to form a three-dimensional support structure, including a triangular support structure. Moreover, the cover 1004 forms a support structure that positions the electronic device 1070 in a manner such that a display (not shown in FIG. 16) of the electronic device 1070 is generally upright and readily viewable for a user. The non-labeled lines represent visual information emitted from the display of the electronic device 1070.

The segment 1052a and the segment 1052b can rotate using the folding region 1054a and the folding region 1054b, receptively, and the segment 1052a can provide a support structure for direct support/engagement with the receptacle 1002. The segment 1052c forms a base, or flat support base. The hinge 1006 allows the receptacle 1002 to pivot and rotate relative to the segment 1052c. By dividing the power supply of the accessory device 1000 into a segmented power supply (defined by the power supply 1022a, the power supply 1022b, and the power supply 1022c), the cover 1004 provides greater flexibility and benefits in the form of a support structure for the electronic device 1070.

Figure 17:
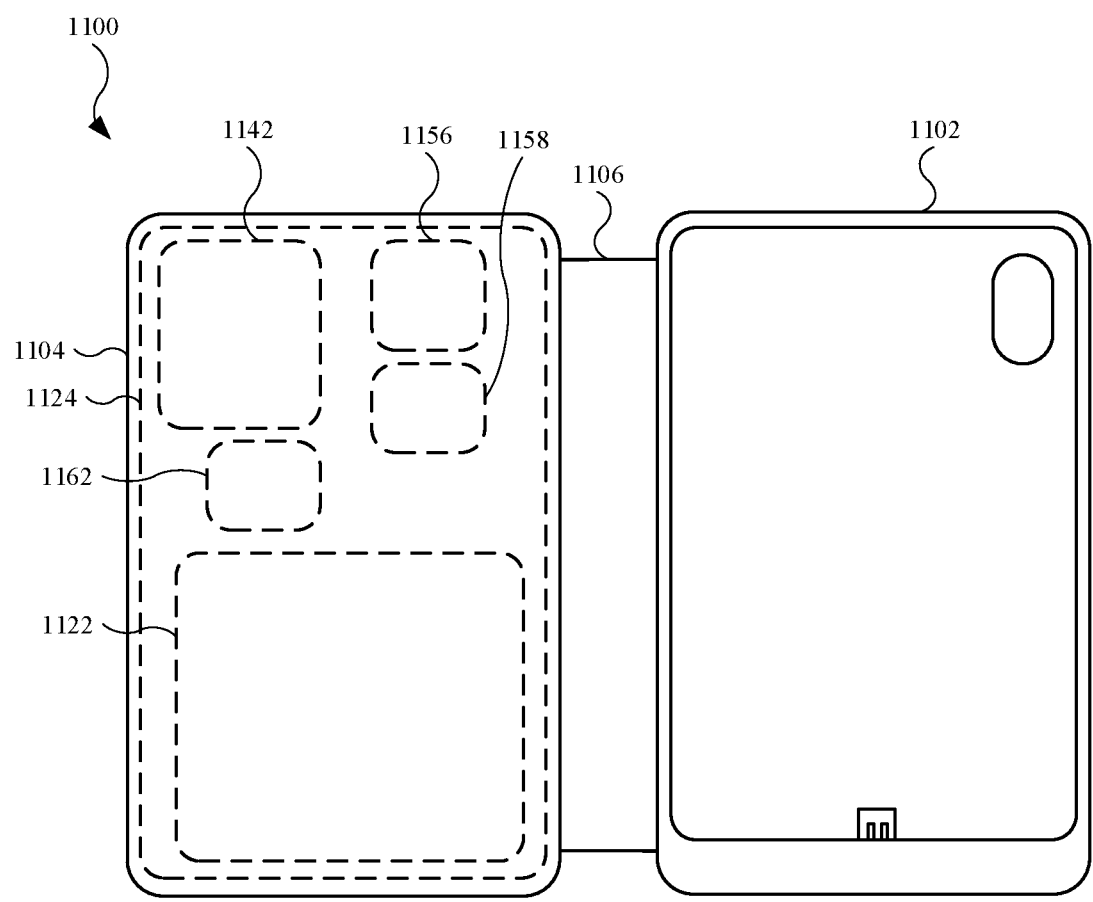
FIG. 17 illustrates a plan view of an alternate embodiment of an accessory device, showing the accessory device with a cover that includes several components, in accordance with some described embodiments.

FIG. 17 illustrates a plan view of an alternate embodiment of an accessory device 1100, showing the accessory device 1100 with a cover 1104 that includes several components, in accordance with some described embodiments. The accessory device 1100 includes a receptacle 1102 designed to receive and carry an electronic device (not shown in FIG. 17). The accessory device 1100 further includes a cover 1104 that is connected to the receptacle 1102 by a hinge 1106. The cover 1104 includes a power supply 1122 and a compartment 1124 that holds the power supply 1122.

The cover 1104 may include additional components in the compartment 1124. For example, the cover 1104 may include a charging module 1142 that includes an inductive charging receiver coil designed to receive energy (through electromagnetic or magnetic induction) that is used to charge the power supply 1122. Alternatively, the charging module 1142 includes an inductive charging transmitter coil that receives energy from the power supply 1122, and transmits the energy (through electromagnetic or magnetic induction) to charge a battery in an external device (not shown in FIG. 17), such as a user accessory. Still, in some embodiments, the charging module 1142 includes a charging coil that acts as both an inductive charging receiver coil and an inductive charging transmitter coil.

The cover 1104 may further include a sensor 1156 at least partially located in the compartment 1124. The sensor 1156 is designed to detect ambient environmental conditions. For example, the sensor 1156 may include an ultraviolet ("UV") sensor designed to measure ambient UV conditions. Alternatively, the sensor 1156 may include a temperature sensor that detects ambient temperature.

The cover 1104 may further include wireless circuitry 1158 located in the compartment 1124. The wireless circuitry 1158 is used to communicate with an electronic device (not shown in FIG. 17) that is carried by the accessory device 1100 in the receptacle 1102. The wireless circuitry 1158 may communicate information received by the power supply 1122, the charging module 1142, and/or the sensor 1156. As non-limiting examples, the wireless circuitry 1158 may include wireless communication circuitry such as near-field communication ("NFC"), or communication protocol and data exchanges included in standards covered by ISO/IEC 14443 and ISO/IEC. In this regard, the wireless circuitry 1158 may include features such as card emulation, read/write capabilities, and/or peer-to-peer information exchange. Alternatively, the wireless circuitry 1158 may include wireless technology standards transmitted and received in a band in the 2.400 to 2.485 Gigahertz ("GHz") range, also referred to as BLUETOOTH®. Alternatively, the wireless circuitry 1158 may include wireless technology standards transmitted and received in a band in the 2.400 to 5.000 Gigahertz ("GHz") range, also referred to as WIFI®. Although not shown, the accessory device 1100 may also include wired communication for the power supply 1122, the charging module 1142, and the sensor 1156.

The cover 1104 may further include circuitry 1162 that can take the form of processor circuitry and memory circuitry. The processor circuitry can receive information received by the power supply 1122, the charging module 1142, and the sensor 1156. The processor circuitry can run software applications and/or algorithms stored on the memory circuit, with the software applications and/or algorithms written for use with the power supply 1122, the charging module 1142, and the sensor 1156. The accessory device 1100 may also include wired communication for the power supply 1122, the charging module 1142, the sensor 1156, and the circuitry 1162.

Figure 18:
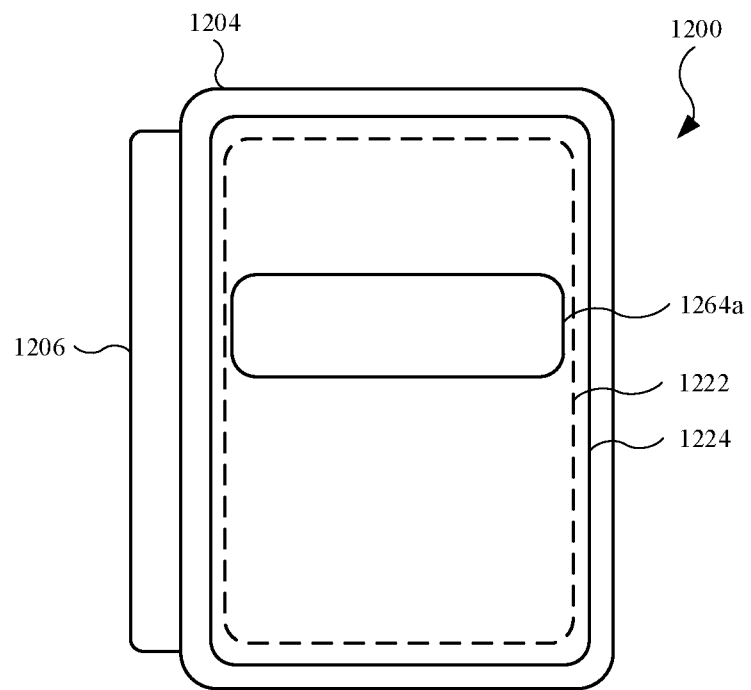
FIG. 18 illustrates a plan view of an alternate embodiment of an accessory device, showing the accessory device with a cover that includes a display, in accordance with some described embodiments.

FIG. 18 illustrates a plan view of an alternate embodiment of an accessory device 1200, showing the accessory device 1200 with a cover 1204 that includes a display 1264a, in accordance with some described embodiments. The accessory device 1200 may include a receptacle (shown later) designed to receive and carry an electronic device. In FIG. 18, the accessory device 1200 is in a closed position, and the cover 1204 is positioned over the receptacle using a hinge 1206 coupled to the cover 1204 and the receptacle. The cover 1204 includes a power supply 1222 and a compartment 1224 that holds the power supply 1222.

The display 1264a is designed to present visual information in the form of motion images, still images, and textual information. The visual information may include notifications received by an electronic device in the receptacle. Additionally, the visual information may include notifications in accordance with information received from components located on the cover 1204, such as information related to the charge/energy state of the power supply 1222. The notifications may be in accordance with information received from other components located on the cover 1204.

Although not shown in FIG. 18, the components may include sensors, charging modules, and/or processor circuitry, as non-limiting examples. When the charging module is present, the notifications may be in accordance with information related to the charge/energy level of the power supply of a user accessory that is being charged by the charging module. Further, the visual information provided by the display 1264a may include a dynamic application toolbar that is specific to a software application (or applications) stored on an electronic device carried by the accessory device 1200.

Figure 19:
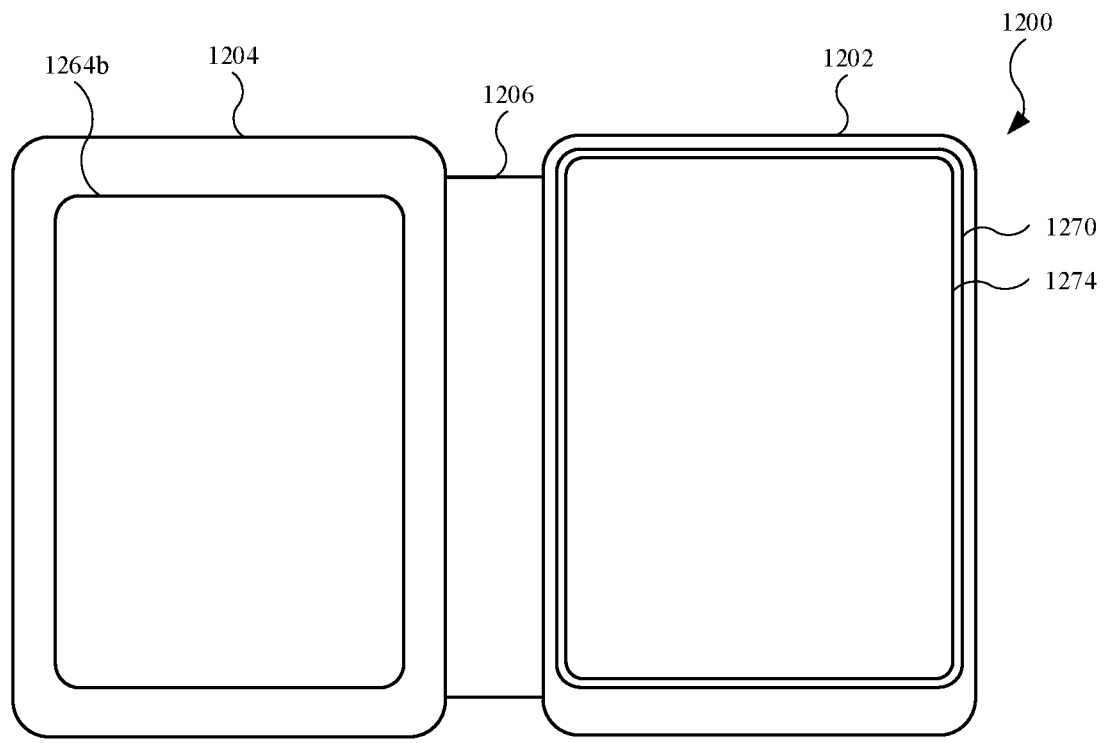
FIG. 19 illustrates a plan view of the accessory device shown in FIG. 18, showing the cover having an additional display, in accordance with some described embodiments.

FIG. 19 illustrates a plan view of the accessory device 1200 shown in FIG. 18, showing the cover 1204 having an additional display, in accordance with some described embodiments. As shown, the cover 1204 includes a display 1264b. The display 1264a (shown in FIG. 18) and the display 1264b may be referred to as a first display and a second display, respectively, of the accessory device 1200. Also, an electronic device 1270 is positioned in the receptacle 1202. The electronic device 1270 may include any features described herein for an electronic device. The accessory device 1200, as shown in FIG. 19, is in an open position, as the cover 1204 is rotated away from the receptacle 1202 via the hinge 1206.

In the open position of the accessory device 1200, a user can readily view both the display 1264b on the cover 1204 and a display 1274 of the electronic device 1270. The display 1264b may be in communication with the display 1274 by wireless or wired communication. In this regard, the display 1264b can receive information from the electronic device 1270, and can present visual information in accordance with the information received by the electronic device 1270. For example, the display 1264b may work in conjunction with the display 1274 to provide textual information from an electronic book. As another example, the display 1264b may work in conjunction with the display 1274 to provide motion images to define a mosaic display system.

Figure 20:
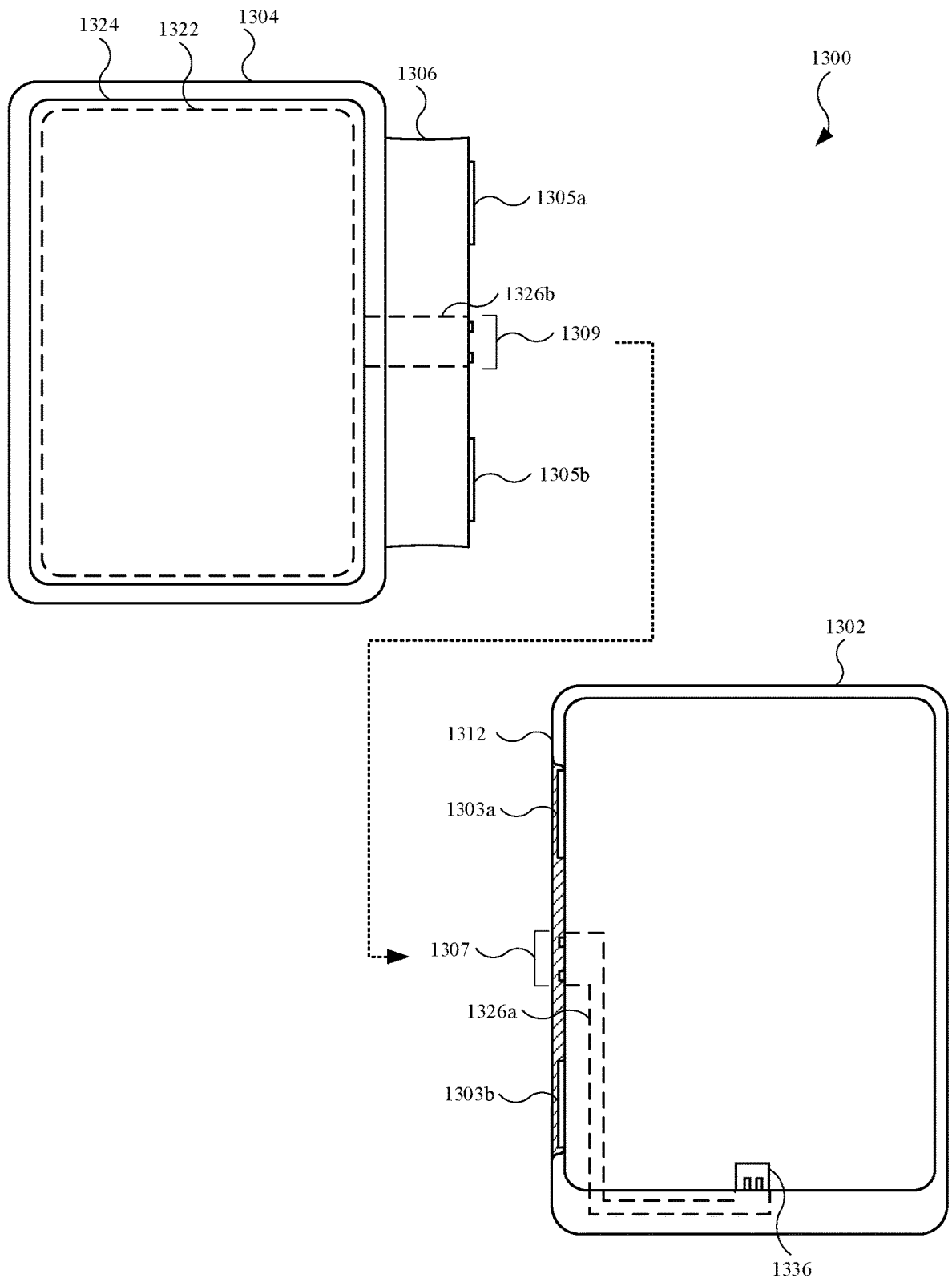
FIG. 20 illustrates a plan view of an alternate embodiment of an accessory device, showing the accessory device with a receptacle and a cover that is removable from the receptacle, in accordance with some described embodiments.

FIG. 20 illustrates a plan view of an alternate embodiment of an accessory device 1300, showing the accessory device 1300 with a receptacle 1302 and a cover 1304 that is removable from the receptacle 1302, in accordance with some described embodiments. As shown, the cover 1304 includes a hinge 1306 that can couple to the receptacle 1302. The cover 1304 further includes a power supply 1322 and a compartment 1324 that holds the power supply 1322.

The receptacle 1302 includes a sidewall 1312. A partial cross sectional view of the sidewall 1312 is shown. The sidewall 1312 may include a magnet 1303a and a magnet 1303b. The hinge 1306 may include a magnet 1305a and a magnet 1305b designed to magnetically couple with the magnet 1303a and the magnet 1303b, respectively. Also, the receptacle 1302 may include contacts 1307 and a connector 1336 that is electrically coupled to the contacts 1307 by a flexible circuit 1326a. The cover 1304 may include contacts 1309 that are electrically coupled to the power supply 1322 by a flexible circuit 1326b. When the magnet 1303a and the magnet 1303b are magnetically coupled with the magnet 1305a and the magnet 1305b, respectively, the contacts 1307 engage, and electrically couple with, the contacts 1309. As a result, the power supply 1322 is electrically coupled to the connector 1336, and an electronic device (not shown in FIG. 20) can electrically couple to the connector 1336 and receive energy from the power supply 1322. Also, in some embodiments (not shown), the connector 1336 is replaced by contacts (such as contacts 128, shown in FIG. 1).

The accessory device 1300 may include some alternatives. For example, the hinge 1306 may extend from the receptacle 1302 (rather than the cover 1304). This modification would result in i) the magnet 1303a, the magnet 1303b, and the contacts 1307 being located on the hinge 1306, and ii) the magnet 1305a, the magnet 1305b, and the contacts 1309 being located on the cover 1304. Also, the aforementioned magnets can be substituted with mechanical interlocks (such as fasteners or pins).

Figure 21:
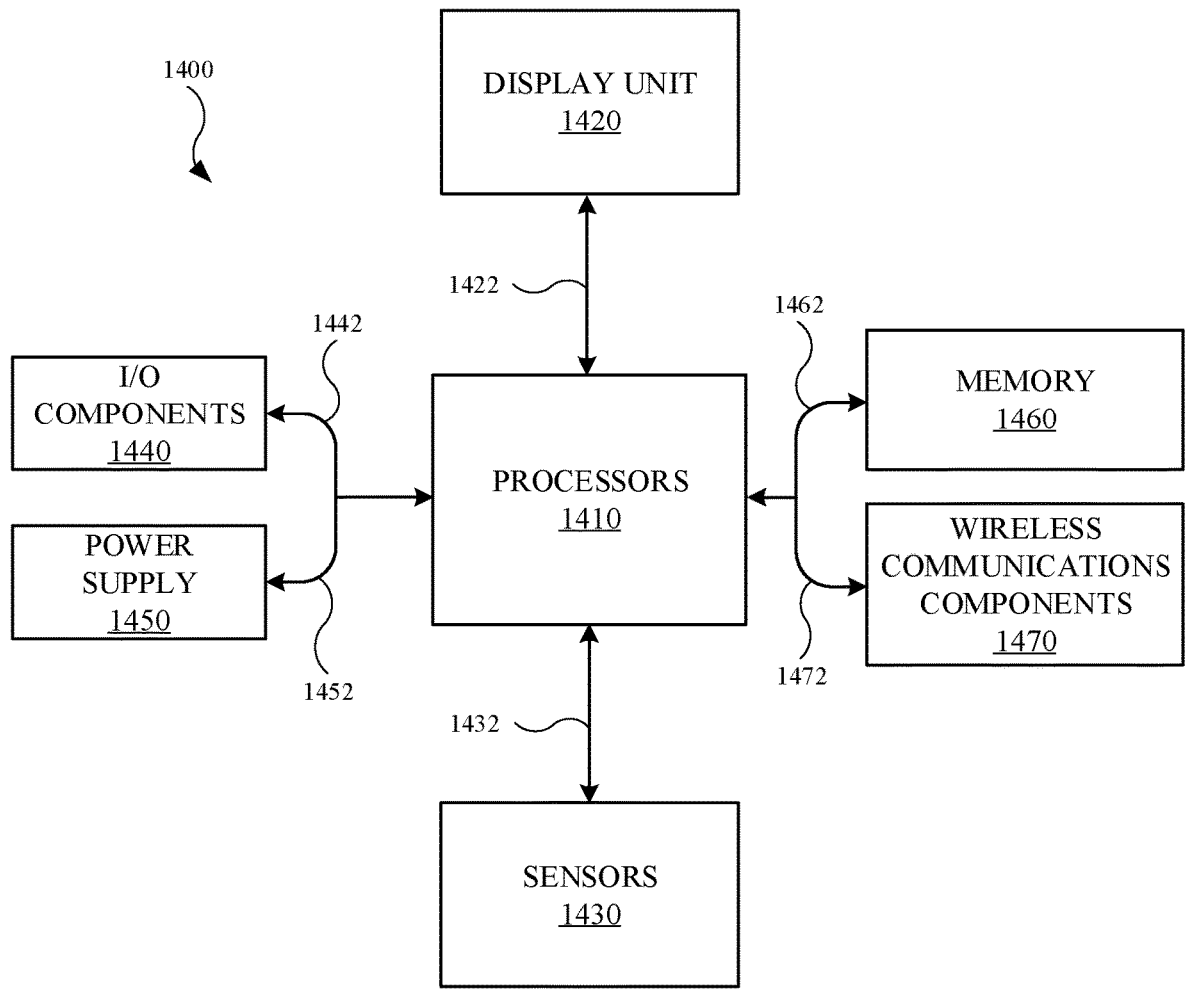
FIG. 21 illustrates a block diagram of an accessory device, in accordance with some described embodiments.

FIG. 21 illustrates a block diagram of an accessory device 1400, in accordance with some described embodiments. The features in the accessory device 1400 may be present in other accessory devices described herein. The accessory device 1400 may include one or more processors 1410 for executing functions of the accessory device 1400. The one or more processors 1410 can refer to at least one of a central processing unit (CPU) and at least one microcontroller for performing dedicated functions. Also, the one or more processors 1410 can refer to application specific integrated circuits.

According to some embodiments, the accessory device 1400 can include a display unit 1420. The display unit 1420 is capable of presenting a user interface that includes icons (representing software applications), textual images, and/or motion images. In some examples, each icon can be associated with a respective function that can be executed by the one or more processors 1410. In some cases, the display unit 1420 includes a display layer (not illustrated), which can include a liquid-crystal display (LCD), light-emitting diode display (LED), or the like. According to some embodiments, the display unit 1420 includes a touch input detection component and/or a force detection component that can be configured to detect changes in an electrical parameter (e.g., electrical capacitance value) when the user's appendage (acting as a capacitor) comes into proximity with the display unit 1420 (or in contact with a transparent layer that covers the display unit 1420). The display unit 1420 is connected to the one or more processors 1410 via one or more connection cables 1422.

According to some embodiments, the accessory device 1400 can include one or more sensors 1430 capable of provide an input to the one or more processors 1410 of the accessory device 1400. In some examples, the one or more sensors 1430 may include a UV sensor or a temperature sensor, as non-limiting examples. The one or more sensors 1430 is/are connected to the one or more processors 1410 via one or more connection cables 1432.

According to some embodiments, the accessory device 1400 can include one or more input/output components 1440. In some cases, the one or more input/output components 1440 can refer to a button or a switch that is capable of actuation by the user. In some examples, the one or more input/output components 1440 can refer to a charging module, including an inductive charging receiver coil and/or an inductive charging transmitter coil. In this regard, the one or more input/output components 1440 may include DC to AC converters and/or rectifier circuits (which form AC to DC converters). When the one or more input/output components 1440 are used, the one or more input/output components 1440 can generate an electrical signal that is provided to the one or more processors 1410 via one or more connection cables 1442.

According to some embodiments, the accessory device 1400 can include a power supply 1450 that is capable of providing energy to the operational components of the accessory device 1400. In some examples, the power supply 1450 can refer to a rechargeable battery. The power supply 1450 can be connected to the one or more processors 1410 via one or more connection cables 1452. The power supply 1450 can be directly connected to other devices of the accessory device 1400, such as the one or more input/output components 1440. In some examples, the accessory device 1400 can receive power from another power sources (e.g., an external charging device) not shown in FIG. 21. Also, the power supply 1450 can provide energy to an electronic device carried by the accessory device 1400, and/or to other user accessories positioned on or in the accessory device 1400.

According to some embodiments, the accessory device 1400 can include memory 1460, which can include a single disk or multiple disks (e.g., hard drives), and includes a storage management module that manages one or more partitions within the memory 1460. In some cases, the memory 1460 can include flash memory, semiconductor (solid state) memory or the like. The memory 1460 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of the accessory device 1400. In some embodiments, the memory 1460 refers to a non-transitory computer readable medium. The one or more processors 1410 can also be used to execute software applications. In some embodiments, a data bus 1462 can facilitate data transfer between the memory 1460 and the one or more processors 1410.

According to some embodiments, the accessory device 1400 can include wireless communications components 1470. A network/bus interface 1472 can couple the wireless communications components 1470 to the one or more processors 1410. The wireless communications components 1470 can communicate with other electronic devices via any number of wireless communication protocols, including at least one of a global network (e.g., the Internet), a wide area network, a local area network, a wireless personal area network (WPAN), or the like. In some examples, the wireless communications components 1470 can communicate using NFC protocol, BLUETOOTH® protocol, or WIFI® protocol.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for use with an electronic device, the accessory device comprising:
   a single-piece body comprising:
      a receptacle having a size and shape to receive the electronic device, and
      a cover coupled to the receptacle by a hinge that allows the cover to pivot with respect to the receptacle;
   a power supply carried by the cover; and
   a flexible circuit embedded in the single-piece body, the flexible circuit electrically coupling the power supply with the electronic device when the electronic device is retained in the receptacle.

2. The accessory device of claim 1, wherein:
   the receptacle comprises a wall and a sidewall extending from the wall,
   the cover comprises a first surface capable of engaging the sidewall,
   the cover comprises a second surface opposite the first surface, and
   the power supply is located on the second surface.

3. The accessory device of claim 2, wherein the single-piece body further comprises a compartment that carries the power supply, wherein the compartment is capable of engaging the wall.

4. The accessory device of claim 3, wherein the wall comprises an opening for a camera module of the electronic device.

5. The accessory device of claim 1, further comprising an inductive charging coil carried by the cover and in electrical communication with the power supply.

6. The accessory device of claim 5, wherein the inductive charging coil is capable of charging the power supply.

7. The accessory device of claim 5, wherein the inductive charging coil is capable of i) receiving energy from the power supply and ii) charging, using the energy, a battery of a device positioned on the cover.

8. The accessory device of claim 1, wherein the power supply comprises a removable power supply.

9. An accessory device for use with an electronic device, the accessory device comprising:
   a first portion that defines an internal volume that is capable of receiving the electronic device, the first portion comprising a connector configured to electrically coupled to the electronic device;
   a second portion coupled to the first portion by a hinge, the second portion comprising:
      a compartment that defines an enclosure, and
      a power supply disposed in the enclosure, wherein:
         a closed position comprises the second portion covering the internal volume, and
         an open position comprises i) the first portion being uncovered by the second portion and ii) the power supply being laterally displaced with respect to the first portion; and
   a flexible circuit that extends into the first portion, the hinge, and the second portion, the flexible circuit electrically coupled to the power supply and the connector.

10. The accessory device of claim 9, wherein the first portion comprises a sidewall, and the connector extends from the sidewall.

11. The accessory device of claim 9, further comprising an inductive charging coil located on the second portion.

12. The accessory device of claim 9, wherein the first portion comprises a bottom wall and sidewalls extending from the bottom wall to define the internal volume, and wherein the second portion comprises a cover capable of engaging the sidewalls.

13. The accessory device of claim 12, wherein the flexible circuit defines a single-piece flexible circuit.

14. The accessory device of claim 12, wherein the cover is capable of engaging the sidewalls and the bottom wall.

15. An accessory device for use with an electronic device, the accessory device comprising:
  a receptacle comprising a bottom wall and sidewalls that extend from the bottom wall, wherein the sidewalls combine with the bottom wall to define an internal volume capable of receiving the electronic device, and the bottom wall comprises an opening configured to receive a camera of the electronic device;
  a front cover pivotally coupled with the receptacle by a hinge;
  a power supply embedded in the front cover, the power supply configured to provide power to a battery of the electronic device; and
  an electrical contact positioned on the bottom wall and electrically coupled to the power supply, wherein receipt of the electronic device in the receptacle is capable of causing the electronic device to electrically couple to the electrical contact.

16. The accessory device of claim 15, further comprising a single-piece flexible circuit that extends into the front cover, the hinge, and receptacle, wherein the single-piece flexible circuit electrically couples the power supply to the electrical contact.

17. The accessory device of claim 15, wherein:
  the electrical contact defines a first electrical contact, and
  the front cover comprises a second electrical contact configured to receive power.

18. The accessory device of claim 15, wherein the electrical contact comprises a first electrical contact, and wherein the accessory device further comprises:
  a second electrical contact located on the hinge; and
  a third electrical contact located on one of the sidewalls, the third electrical contact electrically coupled to the second electrical contact.

19. The accessory device of claim 18, wherein the front cover is removably coupled to the receptacle, and wherein when the front cover is coupled to the receptacle, the second electrical contact is in electrical communication with the third electrical contact.

20. The accessory device of claim 15, further comprising:
  a carrier located on the front cover, the carrier configured to receive an accessory device for use with the electronic device; and
  an inductive charging module disposed in the carrier and configured to charge the accessory device when the accessory device is disposed in the carrier.

* * * * *